(12) United States Patent
Mancini et al.

(10) Patent No.: US 9,701,083 B2
(45) Date of Patent: Jul. 11, 2017

(54) PROCESS AND APPARATUS FOR MANUFACTURING TYRES FOR VEHICLE WHEELS

(75) Inventors: Gianni Mancini, Milan (IT); Maurizio Marchini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 268 days.

(21) Appl. No.: 13/055,266

(22) PCT Filed: Jul. 23, 2008

(86) PCT No.: PCT/IB2008/001912
§ 371 (c)(1),
(2), (4) Date: Jan. 21, 2011

(87) PCT Pub. No.: WO2010/018420
PCT Pub. Date: Feb. 18, 2010

(65) Prior Publication Data
US 2011/0120625 A1    May 26, 2011

(51) Int. Cl.
   *B29D 30/32* (2006.01)
(52) U.S. Cl.
   CPC ...... *B29D 30/32* (2013.01); *B29D 2030/3207* (2013.01); *B29D 2030/3257* (2013.01);
   (Continued)
(58) Field of Classification Search
   CPC .. B29D 30/18; B29D 30/32; B29D 2030/265; B29D 2030/2657; B29D 2030/3214;
   (Continued)

(56) References Cited

U.S. PATENT DOCUMENTS

| 2,455,038 A * | 11/1948 | Breth ..................... B29D 30/28 152/552 |
| 2,951,526 A * | 9/1960 | Haase ........................ 156/401 |

(Continued)

FOREIGN PATENT DOCUMENTS

| AT | 317 014 | 8/1974 |
| DE | 853 346 C | 10/1952 |

(Continued)

OTHER PUBLICATIONS

Translation of JP 60-092837A, patent document published May 24, 1985.*

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A process for manufacturing a tire for vehicle wheels, includes building, on a forming support extending about an axis, a carcass structure including at least one carcass ply and, at at least one end edge of the at least one carcass ply, at least one annular anchoring structure. Building the carcass structure includes laying the carcass ply on the forming support, bringing the annular anchoring structure in contact position with the end edge of the carcass ply and turning up the end edge about the annular anchoring structure so as to form a turned up end portion of the carcass ply including the annular anchoring structure. A first part of turning up the end edge of the carcass ply is carried out while at least one positioning device retains the annular anchoring structure in contact position with the end edge of the carcass ply.

20 Claims, 11 Drawing Sheets

(52) U.S. Cl.
CPC ............... *B29D 2030/3264* (2013.01); *B29D 2030/3278* (2013.01)

(58) Field of Classification Search
CPC .... B29D 2030/3257; B29D 2030/3278; B29D 2030/481; B29D 2030/3207; B29D 2030/3264
USPC ................ 156/131, 132, 135, 398, 400–403
See application file for complete search history.

(56) References Cited

U.S. PATENT DOCUMENTS

| | | | |
|---|---|---|---|
| 3,776,793 A | | 12/1973 | Frazier |
| 3,923,572 A | * | 12/1975 | Garver .................. B29D 30/36 156/130 |
| 4,353,771 A | * | 10/1982 | Yuhas ........................... 156/403 |
| 4,498,948 A | | 2/1985 | Brown et al. |
| 4,508,586 A | | 4/1985 | Brown et al. |
| 4,582,557 A | * | 4/1986 | Enders .......................... 156/401 |
| 4,584,038 A | | 4/1986 | Enders |
| 4,634,489 A | * | 1/1987 | Dupommier ....... B29D 30/2607 156/126 |
| 4,705,589 A | * | 11/1987 | Enders .................. B29D 30/32 156/132 |
| 5,858,165 A | | 1/1999 | Takasuga |
| 6,318,434 B1 | | 11/2001 | Gutknecht et al. |
| 6,758,930 B1 | * | 7/2004 | Felten ................... B29D 30/20 156/111 |
| 2004/0250941 A1 | * | 12/2004 | Jungk ........................... 156/132 |
| 2005/0150587 A1 | | 7/2005 | Wiens |
| 2005/0211366 A1 | | 9/2005 | Ogawa |
| 2006/0102272 A1 | | 5/2006 | Iyanagi et al. |
| 2010/0276068 A1 | * | 11/2010 | Marchini et al. ............. 156/133 |

FOREIGN PATENT DOCUMENTS

| | | | |
|---|---|---|---|
| DE | 17 29 571 | A1 | 6/1971 |
| DE | 21 18 467 | A1 | 10/1972 |
| DE | 24 11 013 | A1 | 9/1975 |
| EP | 0 150 925 | A1 | 8/1985 |
| EP | 1 537 986 | A1 | 6/2005 |
| FR | 2006441 | A * | 12/1969 |
| GB | 878837 | | 10/1961 |
| GB | 1153944 | | 6/1969 |
| JP | 36-009444 | | 7/1961 |
| JP | 49-103967 | A * | 10/1974 |
| JP | 50-077471 | U * | 7/1975 |
| JP | 50-128779 | | 10/1975 |
| JP | 58-215337 | | 12/1983 |
| JP | 60-92837 | | 5/1985 |
| JP | 60-092837 | A * | 5/1985 |
| JP | 01-127826 | | 11/1987 |
| JP | 2001-525748 | | 11/2001 |
| WO | WO 2008/001154 | A1 | 1/2008 |
| WO | WO-2008/001154 | A1 | 1/2008 |
| WO | WO-2009/054185 | A1 | 4/2009 |
| WO | WO 2009/063264 | A1 | 5/2009 |
| WO | WO-2009/063264 | A1 | 5/2009 |
| WO | WO-2010/064066 | A1 | 6/2010 |

OTHER PUBLICATIONS

International Search Report from the European Patent Office for International Application No. PCT/IB2008/011933, (WO 2010/064066 A1), (Mail date Apr. 14, 2009).

Mancini, et al., "Apparatus and Process for Manufacturing Tyres for Vehicle Wheels", U.S. Appl. No. 13/055,144, filed Jan. 20, 2011.

International Search Report from the European Patent Office for International Application No. PCT/IB2008/001912 mailed Apr. 20, 2009.

Notification of the First Office Action issued by State Intellectual Property Office of the People's Republic of China in corresponding Application No. CN 20080130439.9 on Feb. 16, 2013 (6 pages).

Notice of Reasons for Rejection issued Oct. 2, 2012, by Japan Patent Office in corresponding Application No. JP 2011-519245 (3 pages).

English-language translation of Notice of Reasons for Rejection issued Oct. 2, 2012, by Japan Patent Office in corresponding Application No. JP 2011-519245 (4 pages).

\* cited by examiner

PROCESS AND APPARATUS FOR MANUFACTURING TYRES FOR VEHICLE WHEELS

CROSS REFERENCE TO RELATED APPLICATION

This application is a national phase application based on PCT/IB2008/001912, filed Jul. 23, 2008.

BACKGROUND OF THE INVENTION

Field of the Invention

The present invention relates to a process and an apparatus for manufacturing tyres for vehicle wheels.

Description of the Related Art

A tyre for vehicle wheel generally comprises a carcass structure comprising at least one carcass ply formed by reinforcing cords embedded in an elastomeric matrix. The carcass ply has end edges respectively engaged with annular anchoring structures. The latter are arranged in the tyre zones usually identified with the name of "beads" and normally consist each of an annular substantially circumferential insert on which at least one filling insert is applied, in a radially outer position thereof. Such annular anchoring structures are commonly identified as "bead cores" and have the task of keeping the tyre well fixed to the anchoring seat specifically provided in the wheel rim, thus preventing, in operation, the radially inner end edge of the tyre coming out from such seat.

At the beads specific reinforcing structures may be provided having the function of improving the torque transmission to the tyre.

In a radially outer position with respect to the carcass ply, a belt structure comprising one or more belt layers is associated, said belt layers being arranged radially one of top of the other and having textile or metal reinforcing cords with crossed orientation and/or substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread, band is applied, made from elastomeric material as well.

Between the tread band and the belt structure a so-called "under-layer" of elastomeric material can be arranged, said layer having properties suitable to ensure a steady union of the tread band itself.

On the side surfaces of the carcass structure respective sidewalls of elastomeric material are also applied, each one extending from one of the side edges of the tread band up to the respective annular anchoring structure to the beads.

With particular reference to the zone of the tyre identified as "bead", this is defined by a free end portion of the carcass ply specifically turned up and housing the annular anchoring structure or bead core therein. The coupling of the bead core to the carcass ply typically comprises a step prior to the step of turning up the free end portion of the carcass ply, wherein the filling insert of the bead core is brought into contact with the end edge of the carcass ply by a specifically provided positioning device and a step simultaneous to the step of turning up the free end portion of the carcass ply, wherein the filling insert of the bead core is laid down or pull down on the end edge of the carcass ply.

U.S. Pat. No. 4,508,586 describes a process wherein the turning up of the free end portion of the carcass ply and the simultaneous pulling down of the filling insert of the bead core on the end edge of the carcass ply is carried out using an air tube specifically provided in an axially external position with respect to the forming support on which the carcass ply is arranged. Such air tube, once inflated, raises the free end portion of the carcass ply so that this can be then turned up by the effect of the thrust action exerted on the air tube inflated by a special thrust device.

US 2005/0150587 A1 describes a process similar to the one discussed above, wherein a specifically designed and shaped air tube is used for turning up the free end portion of the carcass ply and simultaneously pulling down the filling insert of the bead core on the end edge of the carcass ply, without the need of using any thrust device.

US 2006/0102272 A1 describes a process of the type discussed hereinabove, wherein in order to carry out the turning up of the free end portion of the carcass ply and the simultaneous pulling down of the filling insert of the bead core on the end edge of the carcass ply, a mechanical arm provided with pressing rolls at a free end thereof is used in place of an air tube.

SUMMARY OF THE INVENTION

The Applicant has noted that in the processes described above, the retaining into position of the bead core on the end edge of the carcass ply while turning up the free end portion of the carcass ply is only due to the stickiness of the rubber mixture of the bead core with the rubber mixture of the fabric by which the carcass ply is made. Such stickiness is not always sufficient to ensure maintaining the desired concentricity between bead core and forming support of the carcass structure when, during the turning up of the free end portion of the carcass ply, the bead core is subjected to non negligible stresses. In particular, the Applicant believes that the first step of the turning up of the end edge of the carcass ply is the most critical step; in fact, right in that step the bead core is subjected to non negligible stresses directed outwardly in a radial direction.

The Applicant has found that it is possible to ensure maintaining the desired concentricity between bead core and forming support during the turning up of the free end portion of the carcass ply by carrying out a first part of the turning up step of the free end portion of the end edge of the carcass ply while a specifically provided bead core positioning device retains the bead core into contact position with the end edge of the carcass ply, pushing it against the forming support.

In particular, the Applicant has found that starting the turning up of the free end portion of the end edge of the carcass ply while the bead core is still retained into contact with the end edge of the carcass ply against the forming support by the abovementioned bead core positioning device, it is possible to increase the anchoring surface between bead core and carcass ply. In this way an anchoring is obtained which allows to prevent that in the subsequent turning up step, when the bead core is subjected to non negligible stresses and is retained into position on the carcass ply only by the stickiness of the rubber mixture of the bead core with the rubber mixture of the fabric by which the carcass ply is made, the bead core may move from the desired position with respect to the forming support. The desired concentricity between bead core and forming support is thus ensured.

In a first aspect thereof, the present invention therefore relates to a process for manufacturing a tyre for vehicle wheels, comprising the step of building on a forming support extending about a longitudinal axis X-X, a carcass structure comprising at least one carcass ply and, at at least one end edge of the carcass ply, at least one annular anchoring structure, wherein the step of building the carcass structure comprises the steps of:

laying the carcass ply on the forming support;
  bringing the annular anchoring structure in contact position with the end edge of the carcass ply;
  turning up the end edge of the carcass ply about the annular anchoring structure so as to form a turned up end portion of the carcass ply including the annular anchoring structure;

wherein a first part of the step of turning up the end edge of the carcass ply is carried out while at least one positioning device retains the annular anchoring structure in contact position with the end edge of the carcass ply.

Throughout the present description and in following claims, the expression "annular anchoring structure" and the term "bead core" shall often be used without distinction to indicate the same component of the tyre.

Advantageously, the present invention allows manufacturing high quality tyres wherein the position of the bead cores with respect to the forming support is that desired and defined in the design stage, such position not being altered by effect of the stresses the bead core is subjected to during the turning up of the end edge of the carcass ply. According to the invention, the substantial irremovability of the bead core during the turning up of the end edge of the carcass ply is in fact assured both by the fact that a first part of the turning up step is carried out while the bead core is retained into contact position with the end edge of the carcass ply by specifically provided bead core positioning members, and by the fact that the remaining part of the turning up step is carried out when, having already carried out a part of the turning up step, the bead core adheres by stickiness onto the end edge of the carcass ply at an extended surface.

In a second aspect thereof, the present invention relates to an apparatus for manufacturing a tyre, the tyre comprising a carcass structure formed starting from at least one carcass ply laid on a forming support extended about a longitudinal axis X-X, the apparatus comprising:

at least one positioning device of at least one annular anchoring structure on at least one end edge of said at least one carcass ply;
  at least one device for turning up the end edge of the carcass ply;

wherein said at least one positioning device is configured for allowing the turning up device to carry out a first part of the turning up of the end edge of the carcass ply while the positioning device retains the annular anchoring structure in contact position with the above end edge.

Advantageously, such apparatus allows carrying out the process of the present invention mentioned above and thus, it allows achieving the advantages mentioned above.

The present invention, in at least one of the aforementioned aspects, can comprise at least one of the following preferred features.

Preferably, the step of bringing the annular anchoring structure in contact position with the end edge of the carcass ply is carried out by the aforementioned device for positioning the annular anchoring structure. Advantageously, therefore, retaining the annular anchoring structure in contact position on the end edge of the carcass ply is carried out by the same mechanical member that carries out the positioning of the annular anchoring structure on the above end edge. Important advantages are thus achieved in terms of construction simplicity of the apparatus that carries out the aforementioned process, with a consequent considerable reduction of the manufacturing costs.

According to a preferred embodiment of the present invention, the device for positioning the annular anchoring structure is slidable along a direction parallel to the longitudinal axis of the forming support and comprises a radially inner annular portion and a radially outer annular portion slidable with respect to one another along the aforementioned direction. In particular, the radially inner annular portion of the positioning device is adapted to retain the bead core into position acting on the axially outer surface thereof, whereas the radially inner annular portion is also adapted to support the radially inner surface of the bead core.

Preferably, before carrying out the turning up of the end edge about the annular anchoring structure and while the radially outer annular portion of the positioning device retains the annular anchoring structure into contact position with the end edge of the carcass ply, the radially inner annular portion of such positioning device is axially moved away from the forming support for letting free the radially inner surface of the annular anchoring structure.

Advantageously, it is thus possible to start the turning up step of the carcass ply, bringing the carcass ply in contact with the radially inner surface of the bead core, while the bead core is retained into contact position against the forming support by the aforementioned positioning device. A greater adhesion of the bead core on the carcass ply is thus obtained. This leads to important advantages in terms of quality and performance of the tyre. In fact, undesired movements of the bead core due to the high stresses it is subjected to during the remaining part of the turning up step of the end edge of the carcass ply—when retaining of the bead core into position is only given by the stickiness of the mixtures by which the bead core and the carcass ply are made—are thus prevented.

Throughout the present description and in following claims, the terms "radial" and "axial" and the expressions "radially inner/outer" and "axially inner/outer" are used with reference to the radial direction and to the axial direction of the forming support. The terms "circumferential" and "circumferentially" instead, are used referring to the annular extension of the forming support.

Preferably, before the annular anchoring structure is placed in contact position with the end edge of the carcass ply, such end edge is pull down towards the axis X-X of the forming support by at least one ply pulling down device and, before turning up the end edge of the carcass ply about the annular anchoring structure, said at least one ply pulling down device is axially moved away from the forming support for exposing the radially inner surface of the annular anchoring structure to the end edge of the carcass ply.

More preferably, the abutment of the end edge of the carcass ply towards the axis X-X of the forming support is carried out by the pulling down device by the movement of the positioning device of the annular anchoring structure towards the forming support along a direction parallel to axis X-X of the forming support. Clear advantages are thus achieved in terms of construction simplicity of the apparatus that carries out said process, with a consequent considerable reduction of the manufacturing costs.

Preferably, before carrying out the remaining part of the step of turning up the end edge of the carcass ply, also the radially outer annular portion of the positioning device of the annular anchoring structure is axially moved away from the forming support. It is thus possible to complete the turning up of the end edge of the carcass ply; during such step, the bead core is not supported by the bead core positioning device anymore but it remains firmly anchored by stickiness to the carcass ply both at the side surface thereof facing the forming support and at the radially inner surface thereof. In fact, it is noted that in this last step of turning up, the bead core is not subjected anymore to the same stresses directed outwardly in a radial direction to which on the other hand, it is subjected in the first step of the turning up.

The desired position of the bead core with respect to the forming support is thus maintained during the entire turning up step, despite to the high stresses the bead core is subjected to in the first step of turning up of the carcass ply. This leads to important advantages in terms of quality and performance of the tyre.

Preferably, the aforementioned annular anchoring structure comprises a substantially circumferential annular insert and a filling insert associated to the substantially circumferential annular insert in a radially outer position thereof.

In this case, preferably, before starting the turning up of the end edge of the carcass ply, the filling insert is pull down on the carcass ply pushing it against the forming support.

To this end, the apparatus of the present invention preferably comprises at least one device for pulling down the filling insert on the end edge of the carcass ply, such pulling down device being slidingly associated to the positioning device of the annular anchoring structure.

More preferably, the pulling down of the filling insert is carried out while the positioning device of the annular anchoring structure retains the substantially circumferential annular insert in contact position with the end edge of the carcass ply. Advantageously, in this way the undesired movement of the bead core with respect to the forming support is prevented also during the pulling down of the filling insert, with consequent advantages in terms of quality and performance of the tyre.

Preferably, the step of turning up the end edge of the carcass ply is carried out by axially moving and radially expanding a turning up device extended coaxially to the axis X-X of the forming support.

More preferably, the turning up device comprises a plurality of rollers arranged adjacent to one another along a circumferential direction and coaxially to the axis X-X of the forming support, such rollers being radially movable in a synchronous manner with respect to the forming support.

Advantageously, the movement of the aforementioned rollers in the radial direction, besides carrying out the step of turning up the end edge of the carcass ply, allows adjusting the turning up device itself to a plurality of different operating configurations for the manufacturing of tyres having different radial dimension, thus considerably reducing the adjustment costs and times of the process for manufacturing such tyres.

Throughout the following description and in the following claims, the expression: radial dimension of the tyre, indicates the nominal fitting diameter of the rim whereon the tyre is intended to be fitted, such diameter generally being indicated in inches.

In the preferred embodiment of the present invention, each roller is associated to the circumferentially consecutive roller by the interposition of a respective compression spring.

Advantageously, the above springs ensure the structural continuity in circumferential direction of the device for turning up the end edge of the carcass ply. Such springs further ensure maintenance of the desired concentricity of the above device with respect to the axis X-X of the forming support upon the variation of the radial position of the rollers during the turning up of the end edge of the carcass ply and the adjustment of the device in case of manufacturing tyres having different radial dimensions.

Preferably, the aforementioned turning up device is axially and radially moved along a path that reproduces the profile of the annular anchoring structure when the filling insert is pull down on the carcass ply.

As an alternative to the embodiment described above, the turning up device may comprise a plurality of interpenetrating male and female rollers arranged along a circumferential direction, as described in patent application WO 2008/001154 to the same Applicant.

In a further, alternative embodiment of the device for turning up the end edge of the carcass ply, a conventional air tube is used.

In a preferred embodiment of the present invention, at least one device for pulling down the end edge of the carcass ply towards axis X-X of the forming support is further provided, such pulling down device being slidable along the direction parallel to the axis X-X and with respect to the positioning device of the annular anchoring structure, between a non operating axial position and an operating axial position.

Preferably, the device for pulling down the end edge of the carcass ply comprises a plurality of longitudinal finger plates arranged side by side in a circumferential direction and coaxially to the axis X-X.

Preferably, the device for positioning the annular anchoring structure is axially slidable in a radially outer position with respect to the finger plates, the finger plates being kept by said positioning device in a radially contracted configuration when at least the radially inner annular portion of said positioning device is radially overlapped to the finger plates and taking a radially expanded configuration when said positioning device is axially moved with respect to the pulling down device of the end edge of the carcass ply so as not to be radially overlapped to the finger plates.

Advantageously, the radial expansion of the finger plates is actuated by the axial movement of the ply pulling down device with respect to the positioning device of the annular anchoring structure, while the radial contraction of the finger plates is actuated by the axial movement of the positioning device of the annular anchoring structure, or at least of the radially inner annular portion thereof, with respect to the ply pulling down device. An advantageous process economy is thus obtained.

In a preferred embodiment of the present invention, the aforementioned finger plates are partially overlapped in a circumferential direction when the device for pulling down the end edge of the carcass ply is in the axial operating position thereof.

Advantageously, the partial overlapping of the above finger plates in the circumferential direction ensures the desired structural continuity of the ply pulling down device when the finger plates are in the radially expanded configuration, thus achieving an even and effective pulling down of the end edge of the carcass ply.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings.

DETAILED DESCRIPTION OF THE INVENTION

Figure 1:
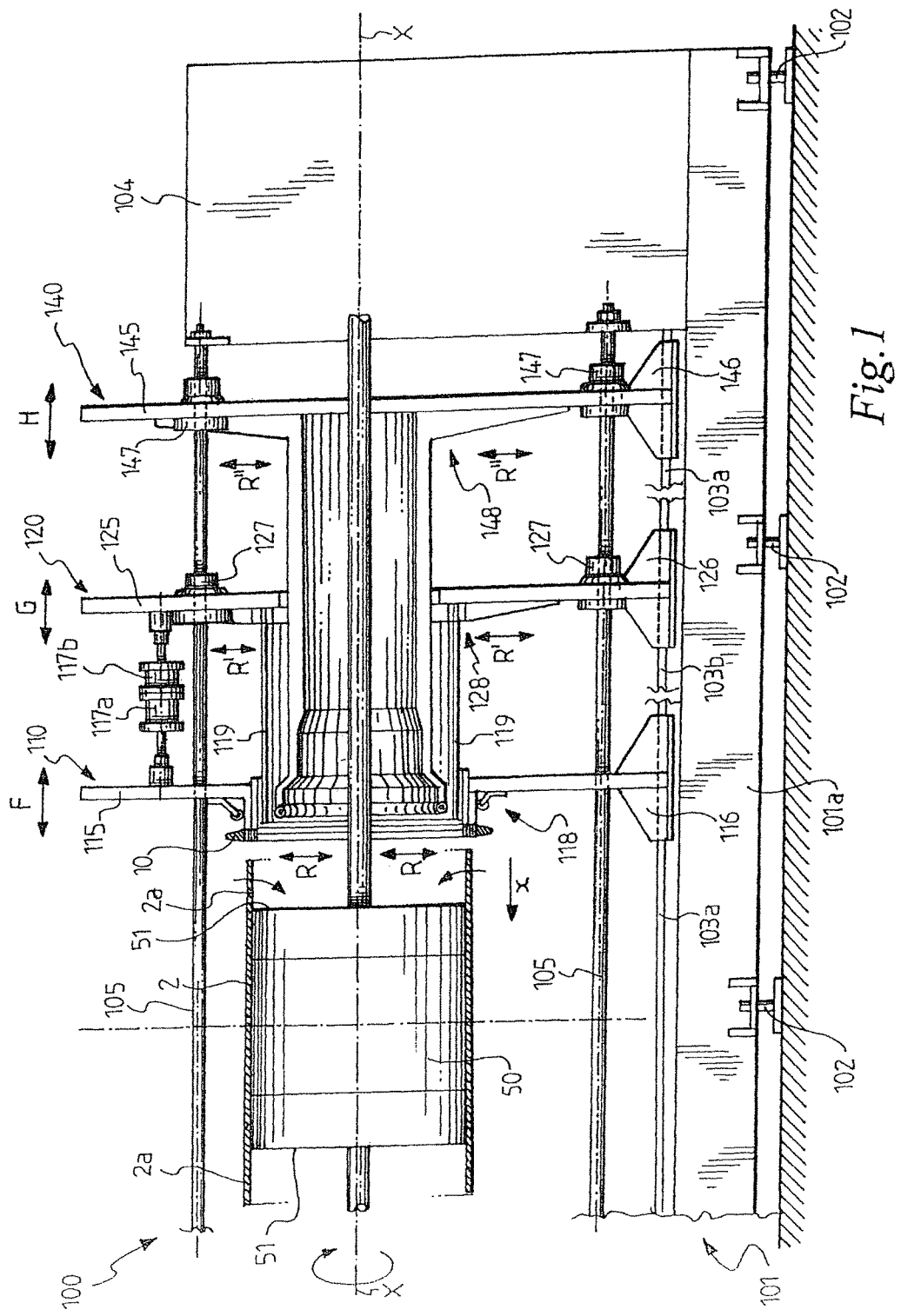
FIG. 1 is a schematic side view of a portion of an apparatus for producing a tyre for vehicles according to the present invention.

In FIG. 1, reference numeral 100 globally indicates a portion of an exemplifying embodiment of an apparatus usable in a process for manufacturing a tyre for vehicle wheels, according to a preferred embodiment of the present invention.

In particular, apparatus 100 is used in a step of building a carcass structure of the tyre for providing one or more annular anchoring structures 10 (hereinafter also called bead cores and better illustrated in FIG. 2 and in FIGS. 8 to 12) at that region of the carcass structure that will make the tyre bead. Such annular anchoring structures 10 are intended for keeping the tyre well fixed to the anchoring seat specifically provided in the vehicle tyre rim.

The building of the carcass structure of the tyre comprises the initial step of laying a carcass ply 2 on a substantially cylindrical forming support 50 so that the opposite end edges 2a of the carcass ply project cantilevered from the forming support 50. Subsequently, each annular anchoring structure 10 is associated to each of the opposite end edges 2a of the carcass ply 2.

In the embodiment illustrated in the annexed figures, each annular anchoring structure 10 is associated to each end edge 2a of the carcass ply 2 at a respective side shoulder 51 of the forming support 50.

For simplicity of description, the description of apparatus 100 and of the process carried out thereby shall be made hereinafter with reference to only one of the opposite end edges 2a of the carcass ply 2 and to one side shoulder 51 of the forming support 50 (thus, with reference to only one of the opposite tyre beads). In fact, apparatus 100 is symmetrical in the axial direction and the description made with reference to one end edge 2a and to one side 51 of the forming support 50 also applies with reference to the axially opposite end edge and side of the forming support 50.

The forming support 50 is rotatably mounted about an axis of rotation X-X in a totally conventional manner. The structure of the forming support 50 is not described in detail hereinafter since it can be made in any convenient manner by a man skilled in the art. Likewise, the members for supporting and moving the forming support 50 shall not be described as they are totally conventional.

Figure 2:
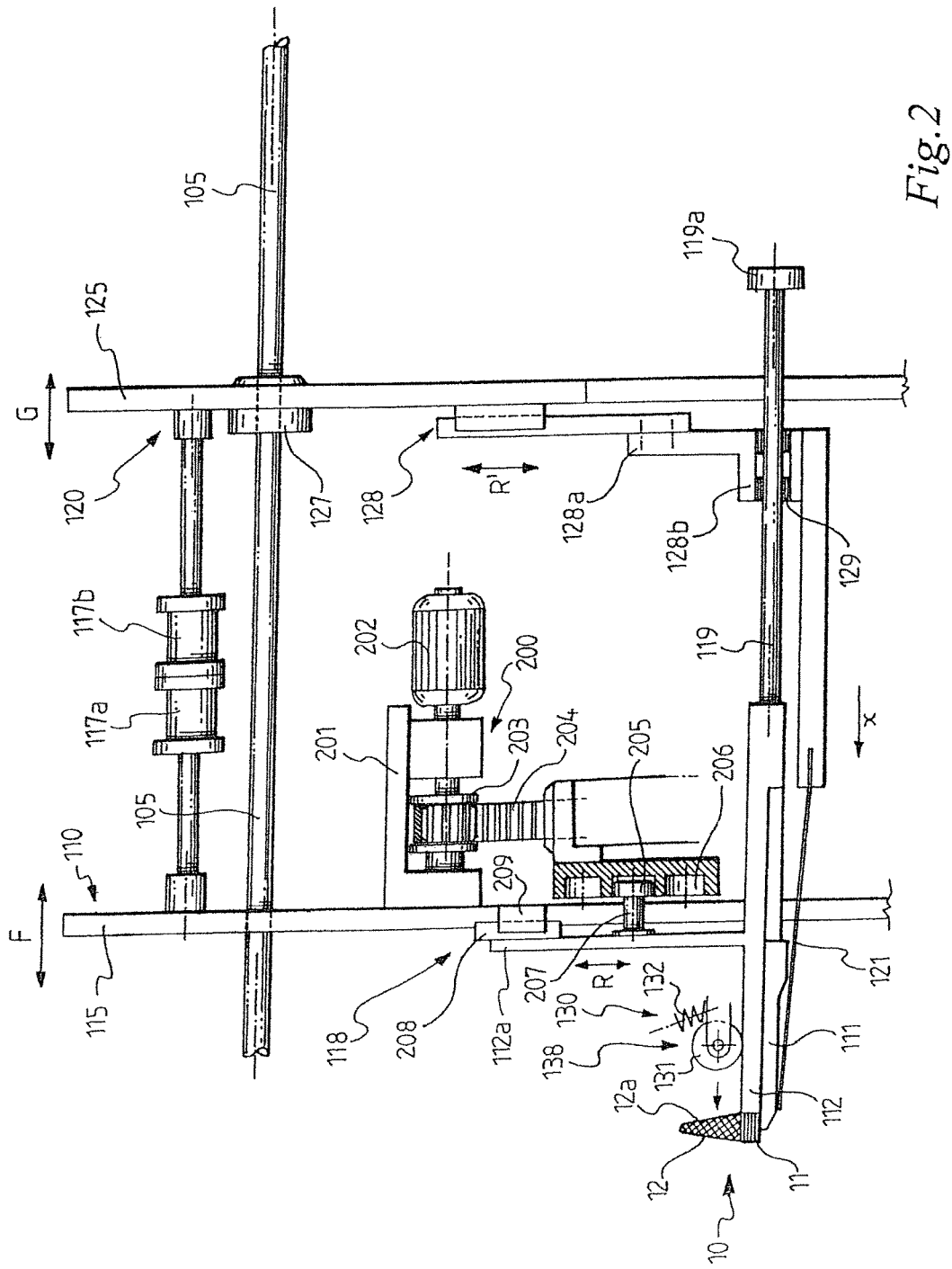
FIG. 2 is an enlarged schematic side view of a portion of a bead core positioning device and of a ply pulling down device of the apparatus of FIG. 1.

As illustrated in FIG. 2 and in FIGS. 8 to 12, the annular reinforcing structure 10 comprises at least one substantially circumferential annular insert 11 and at least one filling insert 12 applied in a radially outer position of the annular insert 11.

With reference to FIG. 1, apparatus 100 comprises a support frame 101 provided with support feet 102. Opposite first pairs of axial sliding tracks 103a (only one track 103a being visible in FIG. 1) and opposite second pairs of tracks 103b (only one track 103b being visible in FIG. 1) parallel to tracks 103a are mounted on a base 101a of the support frame 101.

Apparatus 100 further comprises, at each of the axial ends thereof, a side upright 104 whereon three longitudinal screws 105 are mounted arranged at 120° with respect to each other (only two of such screw being visible in FIG. 1).

Apparatus 100 comprises a device 110 slidable along a direction x parallel to the axis of rotation X-X of the forming support 50, and thus in the two opposite ways of the direction indicated in FIGS. 1, 2, 8 and 9 by arrow F, between a distal position with respect to the forming support 50 and a position proximal to the forming support 50, so as to approach, or move away from, the forming support 50.

Device 110 is intended to support the annular anchoring structure 10 and bring it in contact with the end edge 2a of the carcass ply 2. In particular, device 110 acts on the annular substantially circumferential insert 11 of the annular anchoring structure 10 supporting it and pushing it against shoulder 51 of the forming support 50. The annular anchoring structure 10 is thus positioned at the desired position on the end edge 2a of the carcass ply 2. Hereinafter in the present description, device 110 shall also be defined as "bead core positioning device".

Device 110 comprises an annular element 115 mounted, by means of respective runners 116, on the sliding tracks 103a.

In an alternative embodiment of apparatus 100 (not shown), instead of tracks 103a and of runners 116, longitudinal guides extending from the side upright 104 parallel to the longitudinal screws 105 may be provided for allowing the axial sliding of device 110. Preferably, three longitudinal guides are provided in this case, arranged at 120° with respect to each other, and thus one at each longitudinal screw 105. The annular element 115 in this case is slidingly coupled to the above longitudinal guides by means of respective sliding bushes.

A plurality of bead core positioning members 118 are mounted on the annular element 115 (one of these is shown in detail in FIG. 2 and schematised in FIGS. 8 to 12), said members 118 being arranged adjacent to each other in a circumferential direction and coaxially to the axis X-X of the forming support 50. Each bead core positioning member 118 comprises a radially inner portion 111 for supporting the annular anchoring structure 10, a radially outer portion 112 for pushing the annular anchoring structure 10 and an arm 112*a* integral to the radially outer portion 112 and intended to allow the coupling of the positioning member 118 to the annular element 115.

As better described hereinafter, the radially inner portion 111 and the radially outer portion 112 of each bead core positioning member 118 are slidable with respect to each other in the direction X parallel to the longitudinal axis X-X of the forming support 50.

Preferably, the bead core positioning members 118 are at least eight. More preferably, such members are sixteen or twenty four.

Arms 112*a* are radially and synchronously movable with respect to the axis X-X of the forming support 50, and thus in the two opposite ways of the direction indicated in FIGS. 1 and 2 by arrow R.

The radial synchronous movement of arms 112*a* allows the radial synchronous movement of the bead core positioning members 118 and thus the radial expansion/contraction of the bead core positioning device 110 between a maximum contraction position and a maximum expansion position.

Device 110 can thus take on a plurality of different operating setup configurations according to the radial dimension of the tyre to be manufacturing each of such configurations being defined by a corresponding radial operating position of the bead core positioning members 118.

Details on the way in which the radial movement of arms 112*a*, and thus the radial expansion/contraction of the bead core positioning device 110 are obtained, shall be given hereinafter in the present description.

Apparatus 100 further comprises a device 120 for pulling down the end edge 2*a* of the carcass ply 2 towards the axis X-X of the forming support 50. Such pulling down is required, in the embodiment shown in the annexed drawings, for allowing the bead core positioning device 110 to approach the forming support 50 for positioning the annular anchoring structure 10 at the desired position on the end edge 2*a* of the carcass ply 2. Hereinafter in the present description, device 120 shall also be defined as "ply pulling down device".

As shown in FIGS. 1, 2, 8-12, device 120 is slidable parallel to the axis X-X with respect to the bead core positioning device 110 in the two opposite ways of the direction indicated by arrow G. The sliding of device 120 takes place between a non operating axial position illustrated in FIGS. 1, 2, 8 and 12, and an operating axial position illustrated in FIGS. 9 and 10.

Device 120 comprises an annular element 125 slidingly mounted, by respective runners 126 (FIG. 1), on the sliding tracks 103*b* mounted on base 101. If longitudinal guides parallel to longitudinal screws 105 are provided for the axial sliding of the bead core positioning device 110, also tracks 103*b* and runners 126 (as well as tracks 103*a* and runners 116) may be omitted and the annular element 125 may be slidingly coupled to the above longitudinal guides by respective sliding bushes.

The annular element 125 is further coupled, by respective lead nuts 127, to the longitudinal screws 105. Lead nuts 127, once actuated in rotation, allow the sliding of the annular element 125 along a direction x parallel to the axis X-X of the forming support 50.

The annular element 125 is arranged in an axially external position to the annular element 115 of the bead core positioning device 110 with respect to the forming support 50. Between the annular element 125 and the annular element 115 a pair of pneumatic cylinders 117*a*, 117*b* are provided, these cylinders being intended to control the relative axial sliding of the annular element 115 with respect to the annular element 125.

A plurality of ply pulling down members 128 are mounted on the annular element 125 (one of these is shown in detail in FIG. 2 and in FIGS. 8 to 12) arranged adjacent to each other in a circumferential direction and coaxially to the axis X-X of the forming support 50. Such ply pulling down members 128 comprise respective arms 128*a* radially and synchronously movable with respect to the axis X-X of the forming support 50, and thus in the two opposite ways of the direction indicated in FIGS. 1 and 2 by arrow R'.

The radial synchronous movement of arms 128*a* allows the radial synchronous movement of the ply pulling down members 128 and thus the radial expansion/contraction of the ply pulling down device 120 between a maximum contraction position and a maximum expansion position. Device 120 can thus take on a plurality of different operating setup configurations according to the radial dimension of the tyre to be manufactured, each of such configurations being defined by a corresponding radial operating position of the ply pulling down members 128.

Figure 3:
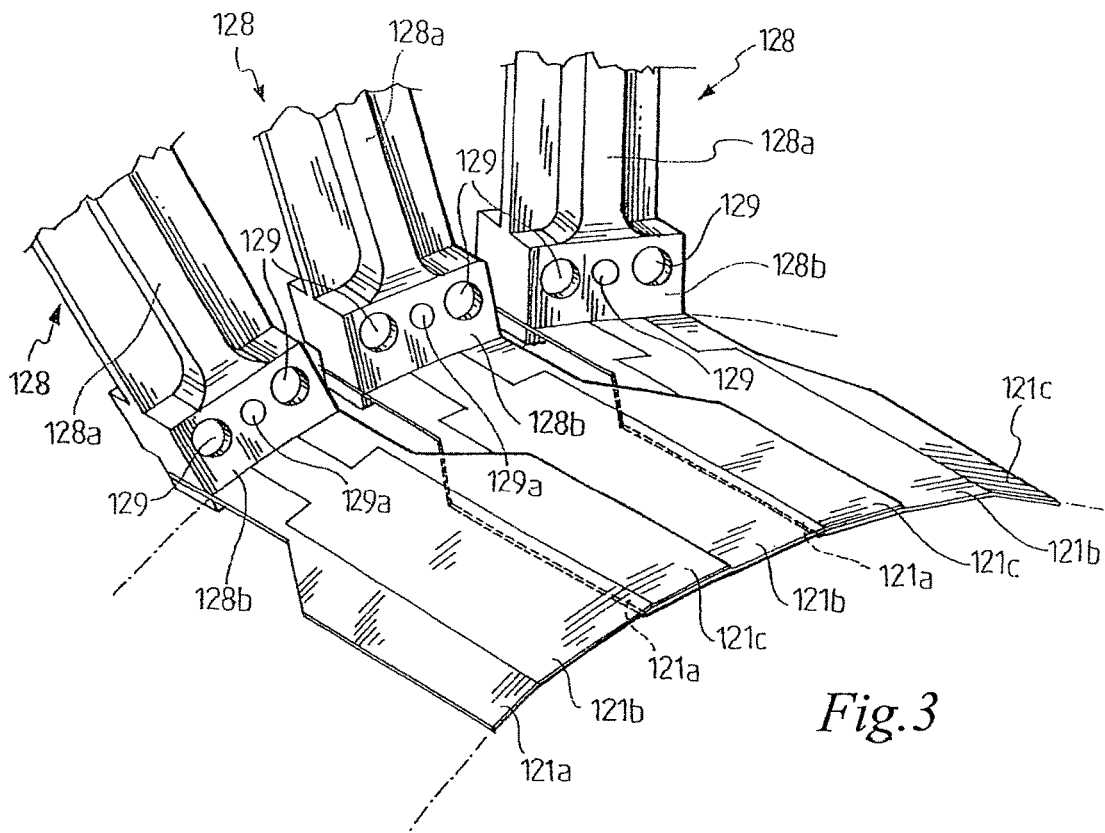
FIG. 3 is a schematic perspective view of a portion of the ply pulling down device of the apparatus of FIG. 1.
Figure 4:
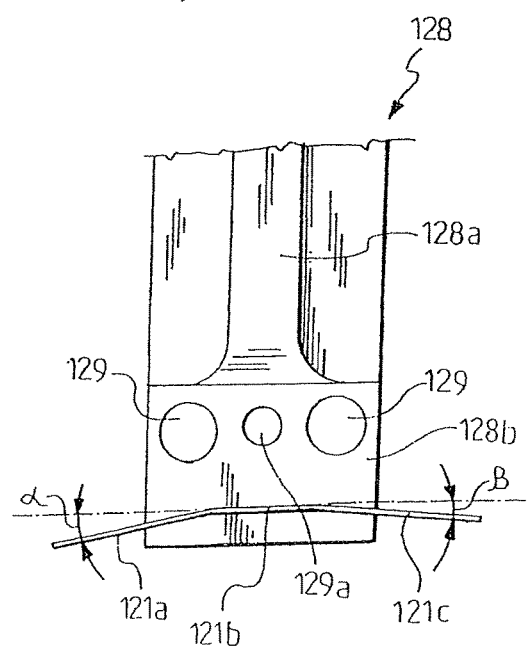
FIG. 4 is a schematic front view of an element of the portion of FIG. 3.

As illustrated in FIGS. 2-4, each ply pulling down member 128 comprises, at a radially inner portion 128*b* of arms 128*a*, a pair of holes 129. Holes 129 house respective sliding guides 119 extending parallel to the axis X-X of the forming support 50 and integral to the thrust member 112 of a respective bead core positioning member 118 (FIG. 2).

Each ply pulling down member 128 therefore is slidable on the sliding guides 119 with respect to the bead core positioning member 118 and is radially supported by the respective bead core positioning member 118 to which it is associated, so that the radial movement of arm 128*a* of each ply pulling down member 128 is actuated by the radial movement of arm 112*a* of the respective bead core positioning member 118.

A central hole 129*a* is provided between holes 129, said hole 129*a* being suitable for housing a sliding guide (not visible in FIG. 2) extending parallel to the axis X-X of the forming support 50 between the sliding guides 119 and integral to the support member 111 of a respective bead core positioning member 118, so as to allow the relative axial sliding of the support portion 111 with respect to the thrust portion 112. Preferably, a compression spring (not shown in FIG. 2) is active between head 119*a* of the sliding guide 119 and the radially inner portion 128*b* of arm 128*a* which, in rest configuration, keeps the support portion 111 in the position shown in FIG. 2.

As illustrated in FIGS. 3 and 4, each ply pulling down member 128 comprises a plurality of finger plates 121 (three in the annexed figures, respectively indicated with 121*a*, 121*b* and 121*c*), extending longitudinally at a radially inner surface of the radially inner portion 128*b* of arms 128*a* and partially overlapped in a circumferential direction. In particular, finger plate 121*c* of a ply pulling down member 128 is partially overlapped to finger plate 121*a* of the same member, whereas the central finger plate 121*b* of such member is partially overlapped to the aforementioned finger plates 121*a* and 121*c*. In order to do so, finger plate 121*a* has an inclination angle α greater than the inclination angle β of finger plate 121*c*, so as to facilitate the overlapping of finger plate 121*c* on finger plate 121*a* (FIG. 4).

FIG. 3 also shows how the circumferentially outer finger plates 121 of two circumferentially consecutive ply pulling down members 128 are arranged in such a way as to also be partially overlapped in a circumferential direction. In particular, finger plate 121*c* of a ply pulling down member 128 is partially overlapped to finger plate 121a of the circumferentially consecutive ply pulling down member 128.

Figure 9:
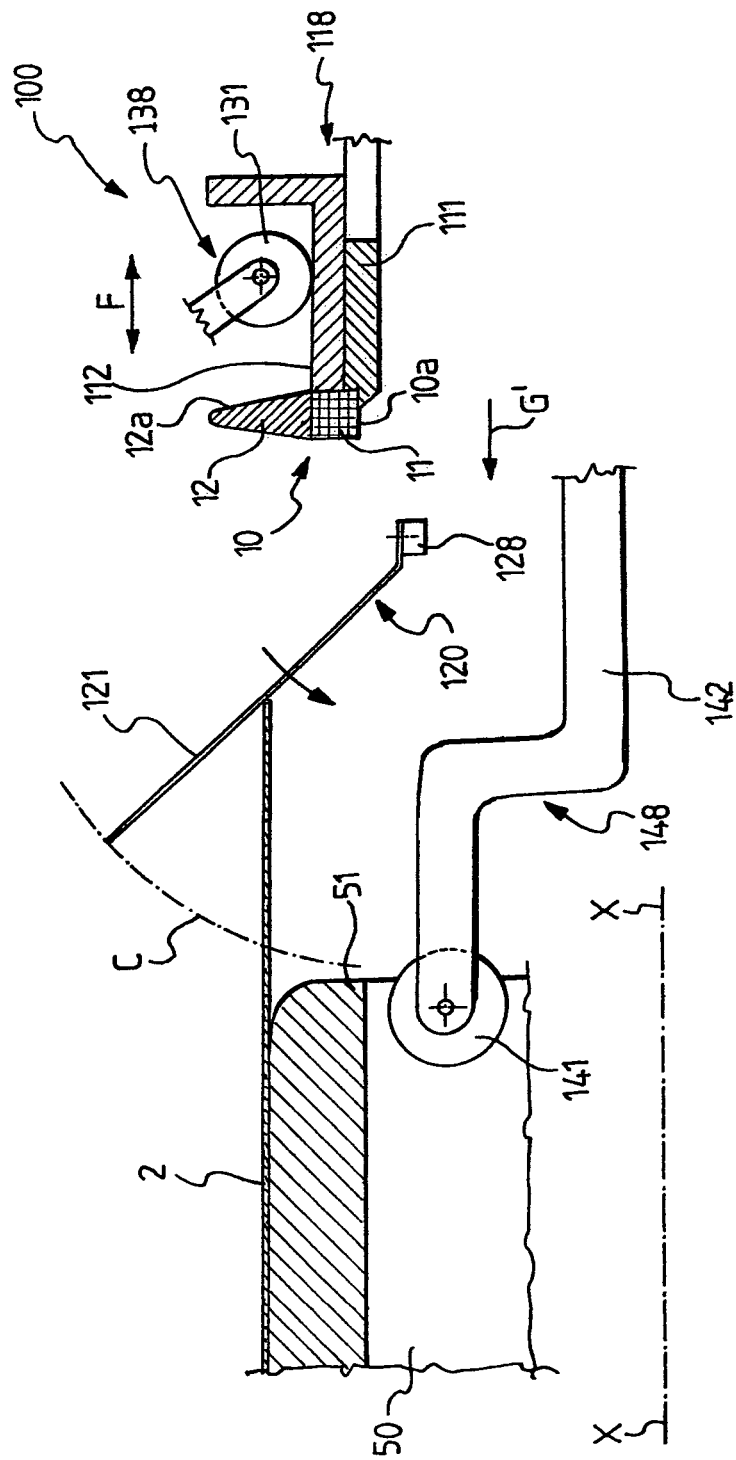
FIG. 9 is a view corresponding to that of FIG. 8, wherein the detail of FIG. 8 is shown in a second operating configuration thereof.

Finger plates 121 are preferably made of elastically bending material and are shaped so that at rest, they take on as a whole an open corolla-like configuration, that is, a configuration expanded in radial direction. FIG. 9 shows one of such finger plates 121 in the radially expanded configuration thereof.

When stressed in radial direction, finger plates 121 on the other hand may take on, as a whole, a closed or radially contracted configuration. FIGS. 2, 8, 10-12 show one of such finger plates 121 in the radially contracted configuration thereof.

During the relative sliding of the ply pulling down device 120 with respect to the bead core positioning device 110, finger plates 121 axially slide in direction x in a position radially internal to the bead core positioning members 118 (FIG. 9).

In the embodiment shown in the annexed figures, finger plates 121 are kept in the radially contracted configuration thereof by the bead core positioning members 118 of the bead core positioning device 110 when such device, or the radially inner portion 111 of such device, is radially overlapped to finger plates 121 (FIGS. 2, 8, 10-12). Finger plates 121 on the other hand, take on the radially expanded configuration when the finger plate pulling down device 120 is axially moved with respect to the bead core positioning device 110 (FIG. 9) in the direction x and so that the latter is not radially overlapped to finger plates 121. In the passage from the radially expanded configuration to the radially contracted configuration, finger plates 121 bend according to the curved dotted line indicated with C in FIG. 9.

The shape and the position of finger plates 121 is such that they remain partially overlapped in the circumferential direction when they are in the radially expanded configuration thereof.

Apparatus 100 further comprises a device 130 for pulling down the filling insert 12, mounted on the bead core positioning device 110 (FIG. 2).

In the specific embodiment illustrated in the above figures, device 130 comprises a plurality of filling insert pulling down members 138 each provided with a respective roller 131 (only one of these is illustrated in FIG. 2 and in FIGS. 8 to 12). Roller 131 is mounted on the top surface of the radially outer portion 112 of each bead core positioning member 118.

In this way, the radial movement of the bead core positioning members 118 causes a corresponding radial movement of rollers 131, and thus the radial expansion/contraction of device 130. The aforementioned device 130 can thus be used for pulling down the filling insert 12 of the annular anchoring structure 10 for different radial dimensions of the tyre to be manufactured.

Rollers 131 are arranged one next to the other in a circumferential direction coaxially with respect to the axis X-X of the forming support 50.

Each roller is elastically associated to the respective bead core positioning member 118, as described in patent application PCT/IB2007/003500 to the same Applicant. In particular, each roller 131 is kept pressed, by a special compression spring 132, against the radially outer surface of the thrust member 112 of the respective bead core positioning member 118.

Figure 10:
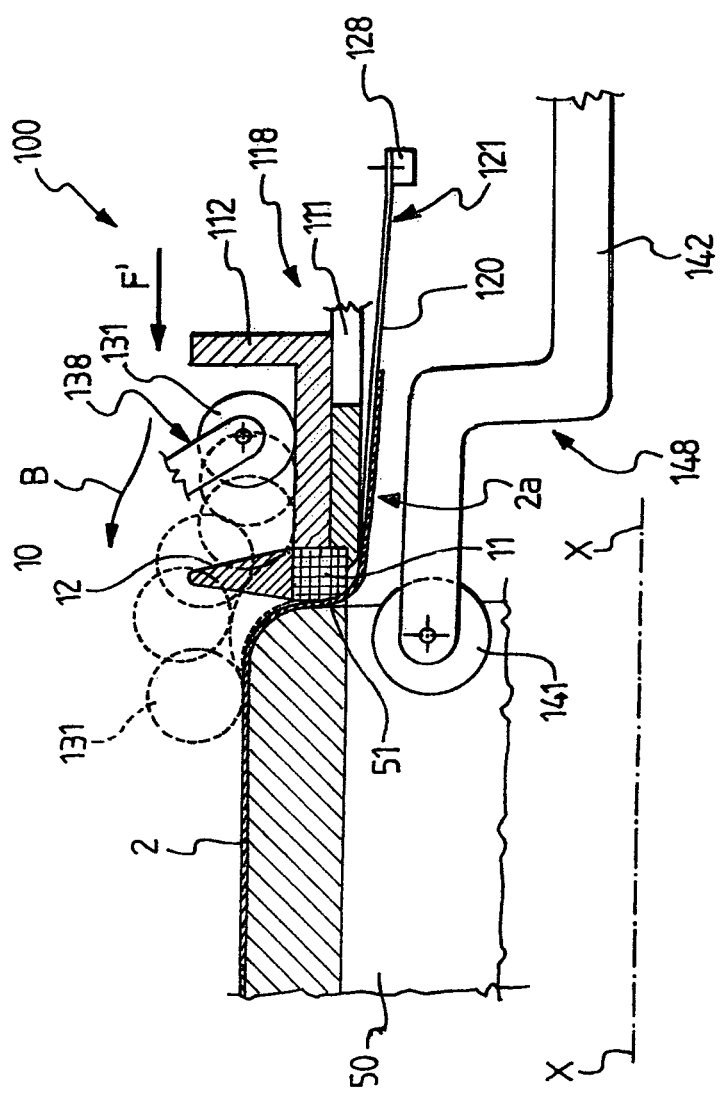
FIG. 10 is a view corresponding to that of FIG. 8, wherein the detail of FIG. 8 is shown in a third operating configuration thereof.

As shown in FIG. 10, the abutment of the filling insert 12 on the end edge 2a of the carcass ply 2 takes place as a consequence of the rolling of rollers 131 on the radially outer surface of the radially outer annular portion 112 of the respective bead core positioning member 118 and on the side surface 12a of the filling insert 12 of the annular anchoring structure 10, starting from a radially inner annular portion of such side surface 12a to continue on a portion of the side surface 12a radially outermost with respect to the aforementioned radially inner annular portion (arrow B in FIG. 10).

Preferably, as shown in FIG. 10, rollers 131 act on the filling insert 12 of the annular anchoring structure 10 while the bead core positioning device 110 pushes the substantially circumferential annular insert 11 of the annular anchoring structure 10 against shoulder 51 of the forming support 50.

However, it is possible to provide alternative embodiments of apparatus 100 of the present invention, wherein device 130 for pulling down the filling insert 12 is defined by a continuous ring axially slidable with respect to the bead core positioning device 110 and having a side profile with a shape conjugated to that of the annular anchoring structure when filling insert 12 is pull down, as is described for example in the aforementioned patent application PCT/IB2007/003500 to the same Applicant.

Apparatus 100 further comprises a device 140 suitable for turning up the end edge 2a of the carcass ply about the annular anchoring structure 10 for forming a turned up end portion of the carcass ply 2 comprising the annular anchoring structure 10 therein. Hereinafter in the present description, device 140 shall also be defined as "turning up device".

Figure 5:
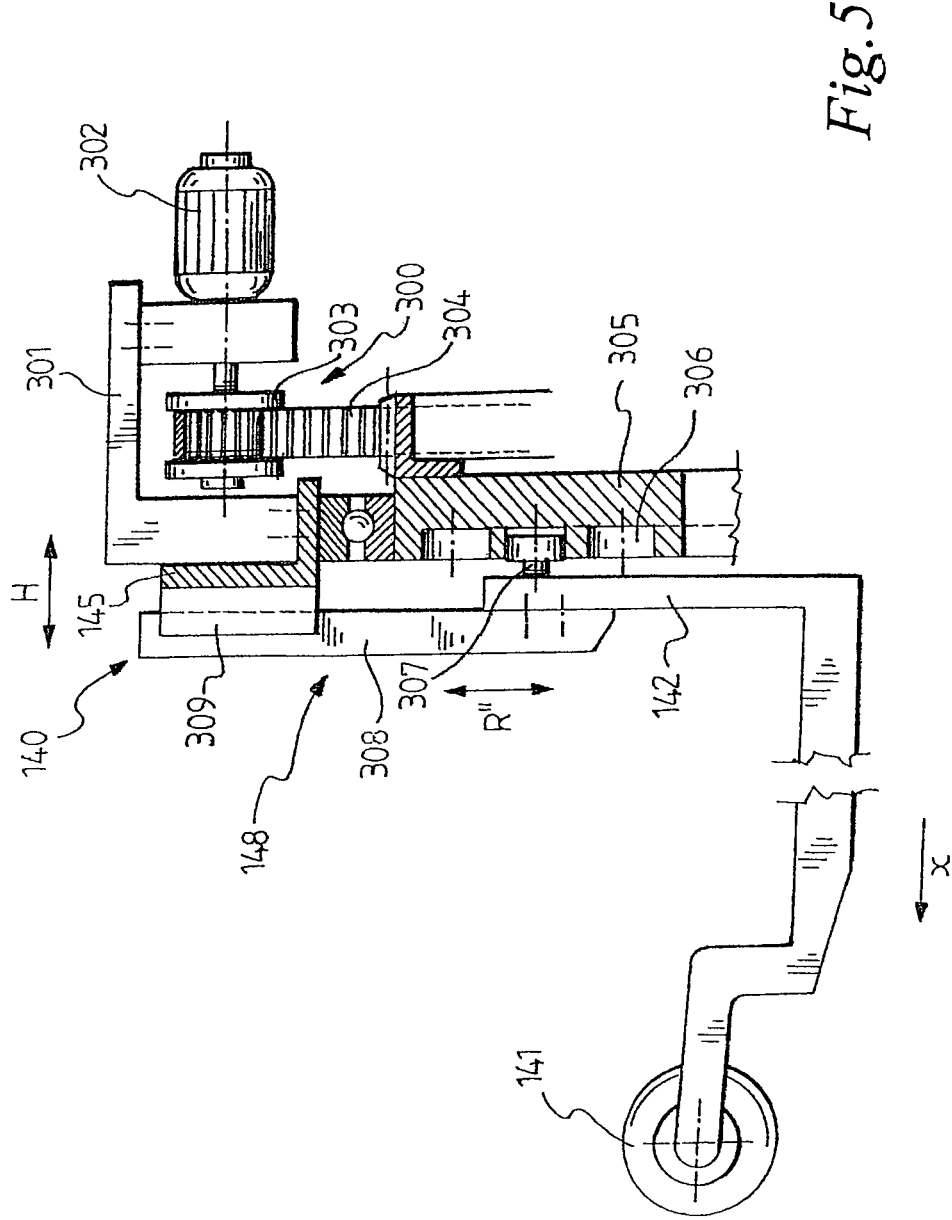
FIG. 5 is an enlarged schematic side view of a portion of a turning up device of the apparatus of FIG. 1.

Device 140 is slidable parallel to the axis. X-X with respect to the bead core positioning device 110 and to the ply pulling down device 120 in the two opposite ways of the direction indicated by arrow H in FIGS. 1, 5 and 8.

As shown in FIG. 1, device 140 comprises an annular element 145 mounted, by respective runners 146, on the sliding tracks 103a and by respective lead nuts 147, to the longitudinal screws 105. Lead nuts 147, once actuated in rotation, allow the sliding of the annular element 145 along the direction x parallel to the axis X-X of the forming support 50.

If longitudinal guides parallel to longitudinal screws 105 are provided for the axial sliding of the bead core positioning device 110 and of the device 120 for pulling down the end edge 2a of the carcass ply 2, in place of tracks 103a, 103b and of runners 116, 126, the annular element 145 is slidingly coupled to the aforementioned longitudinal guides by respective sliding bushes.

The annular element 145 is arranged in an axially external position to the annular element 125 of device 120 for pulling down the end edge of the carcass ply with respect to the forming support 50.

A plurality of turning up members 148 are mounted on the annular element 145 (one of these is shown in detail in FIG. 5 and in FIGS. 8 to 12) arranged adjacent to each other in a circumferential direction and coaxially to axis X-X of the forming support 50.

The number of turning up members 148 is equal to that of the positioning members 118.

Each turning up member 148 comprises a respective roller 141 supported by a respective arm 142. The rollers are arranged adjacent to one another along a circumferential direction and coaxially to the axis X-X of the forming support 50.

Figure 6:
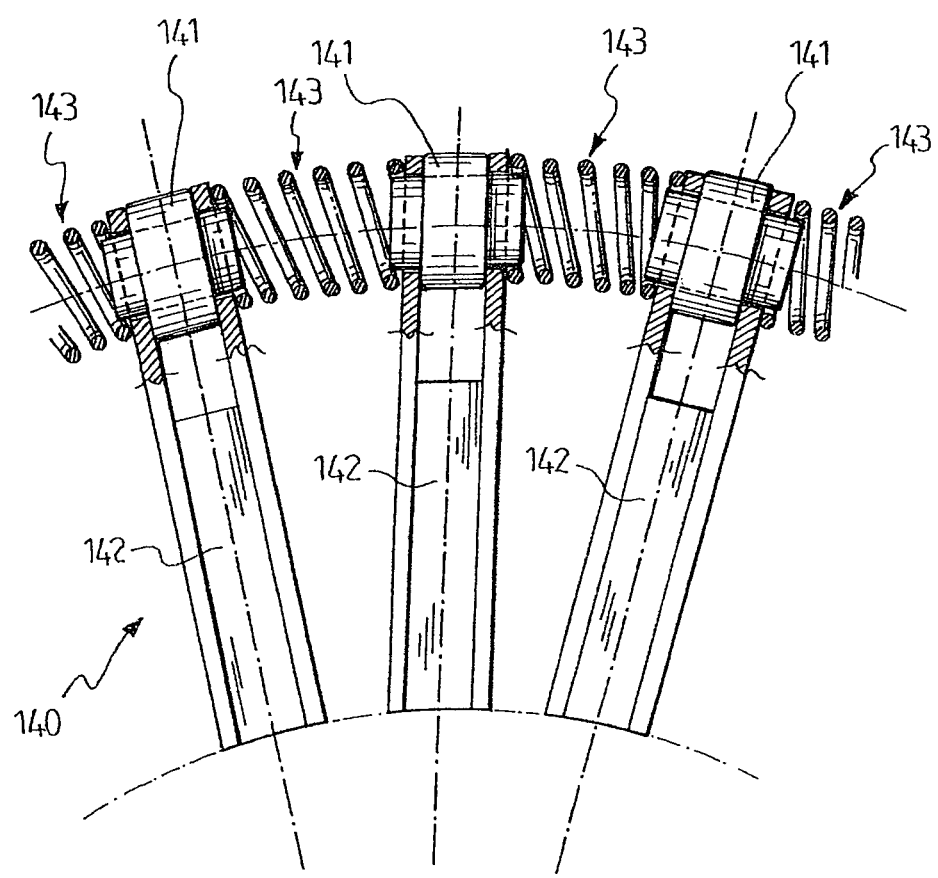
FIG. 6 is a schematic front view of a portion of the device of FIG. 5.

As shown in FIG. 6, each roller 141 is associated to the circumferentially consecutive roller 141 by the interposition of a respective compression spring 143.

Arms 142 are axially and radially movable in a synchronous manner with respect to the forming support 50 along a path that reproduces the profile of the annular anchoring structure 10 when the filling insert 12 is pull down on the carcass ply 2. The synchronised radial movement of arms 142 causes the synchronised radial movement of the turning up members 148 and thus, the radial expansion/contraction of the turning up device 140.

The radial expansion of device 140, along with the axial movement of the above device along the direction x, allows turning up the end edge 2a of the carcass ply 2 about the annular anchoring structure 10, as is described for example in patent application WO2008/001154 to the same Applicant.

The synchronous radial movement of arms 142 of the turning up device 140 with respect to the axis X-X of the forming support 50, and thus in the two opposite ways of the direction indicated in FIGS. 1 and 2 by arrow "R", further allows adjusting the turning up device 140 to a plurality of different operating configurations according to the radial dimension of the tyre to be manufactured, each of such configurations being defined by a corresponding operating radial position of arms 142 of the turning up members 148.

The radial movement of arms 112a of the bead core positioning members 118 takes place synchronously to that of arms 142 of the turning up members 148. Such movement is obtained by respective control devices 200, 300 totally similar.

Figure 7:
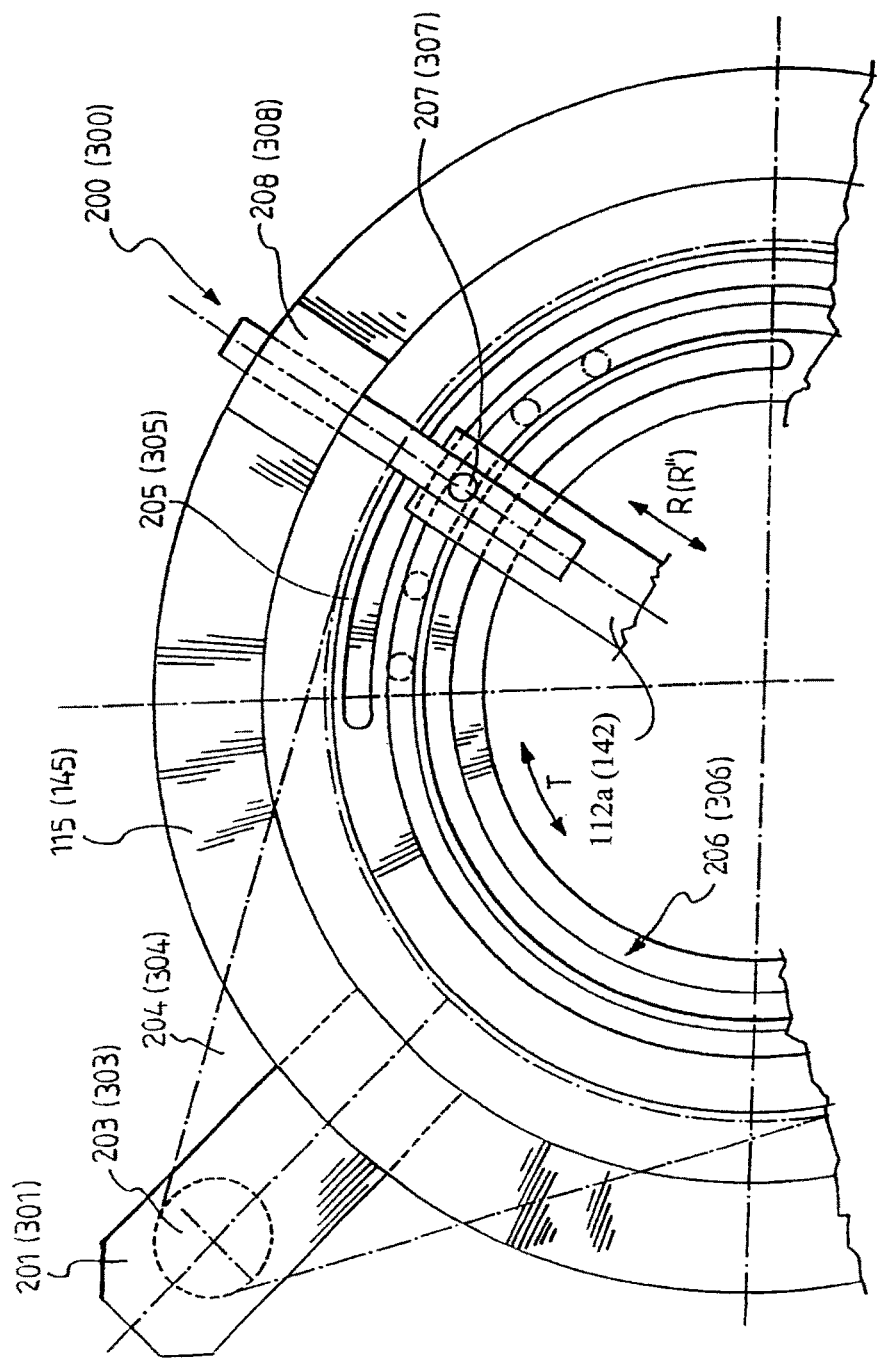
FIG. 7 is a schematic front view of a portion of the bead core positioning device of FIG. 2 and of the turning up device of FIG. 5.

Below is a detailed description of the control device 200 of the radial movement of arms 112a of the bead core positioning members 118, referring to FIGS. 2 and 7. The control device 300 of the radial movement of arms 142 of the turning up members 148 is totally similar to device 200 and its components are identified in FIGS. 3 and 7 with reference numbers corresponding to those related to device 200 and increased by 100. The reference numbers of the components of device 300 are shown hereinafter, and in FIG. 7, in brackets next to the reference numbers of the components of device 200.

Device 200 (300) comprises a bracket 201 (301) attached to the axially outer face of the annular element 115 (145) and intended to support a motor reduction unit 202 (302).

A pulley 203 (303) is further mounted on bracket 201 (301), in axis with the motor reduction unit 202 (302). Motor reduction unit 202 (302) controls the rotation of pulley 203 (303) which, through a belt 204 (304), imparts a rotation to an annular member 205 (305) mounted on the axially outer face of the annular element 115 (145). A helicoidal guide 206 (306) shaped according to an Archimedes spiral is formed on the axially inner face of the annular member 205 (305) (FIG. 7).

Arm 112a (142) of each member 118 (148) is slidingly associated to guide 206 (306) by a respective pin 207 (307). It should be noted that for clarity reasons, only one arm 112a (142) is shown in FIG. 7. Arm 112a (142) of each member 118 (148) is further rigidly connected to a guide 208 (308) which is slidingly associated to a respective runner 209 (309) mounted on the annular element 115 (145) and arranged according to a radial direction. The rotation of the annular member 205 (305) by a predetermined angle along the circumferential direction indicated with T in FIG. 7 therefore causes a corresponding shifting of each arm 112a (142) along the radial direction indicated with R (R") in FIG. 7. The synchronous and centred movement of the bead core positioning members 118 and of the turning up members 148 and thus the radial expansion/contraction of the bead core positioning device 110 and of the turning up device 140 are thus obtained.

In the light of the fact that, as said above, each ply pulling down member 128 and each member 138 for pulling down the filling insert 12 is constrained, in radial direction, to a respective bead core positioning member 118, the radial movement of the ply pulling down members 128 and of the members 138 for pulling down the filling insert 12 takes place integrally to the radial movement of the bead core positioning members 118.

From the above description it is clear that the possibility of the bead core positioning device 110, of the ply pulling down device 120, of the filling insert pulling down device 130 and of the turning up device 140, of radially expanding/contracting with respect to the forming support 50 allows the use of apparatus 100 of the present invention for manufacturing a plurality of tyres having different radial dimension, in particular tyres with at least four different and adjacent fittings.

In particular, the production of a tyre by the aforementioned apparatus 100 comprises the step of building a carcass structure 2 starting from at least one carcass ply 2a laid on a forming support 50. Such step comprises a step of adjusting the bead core positioning device 110, the ply pulling down device 120, the filling insert pulling down device 130 and the turning up device 140, to respective radial positions selected based on the radial dimension of the tyre to be manufactured. Subsequently, the end edge 2a of the carcass ply 2 is pull down, the bead core 10 is positioned, the filling insert 12 of bead core 10 is pull down and the end edge 2a of the carcass ply 2 is turned up around bead core 10, moving the aforementioned devices with respect to the forming support 50.

The above steps are repeated if a first lot of tyres of identical radial dimensions has to be manufactured.

When it is desired to switch to the manufacturing of at least one tyre of radial dimensions differing from those manufactured before, a new forming support 50 is mounted in apparatus 100, whereon a new carcass ply 2 has been laid beforehand, and all of the above steps of pulling down the end edge 2a of the carcass ply 2, positioning the bead core 10, pulling down the filling insert 12 of bead core 10 and turning up the end edge 2a of the carcass ply 2 around the bead core 10 are repeated after having adjusted the bead core positioning device 110, the ply pulling down device 120, the filling insert pulling down device 130 and the turning up device 140 to respective radial positions selected based on the radial dimension of the new tyre to be manufactured.

It is advantageously possible to proceed as described above using the same apparatus 100 for producing four or more lots of tyres of different radial dimensions.

With specific reference to FIGS. 8-12, a preferred embodiment of a process for building the carcass structure shall now be described, such process being carried out by the apparatus 100 described above.

Figure 8:
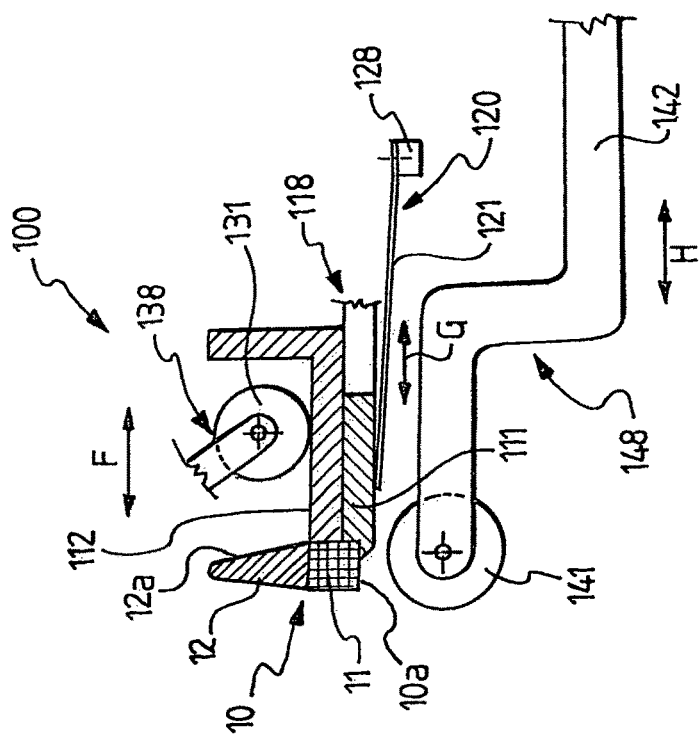
FIG. 8 is a schematic longitudinal section and partially cutaway view of an enlarged detail of the apparatus of FIG. 1 in a first operating configuration thereof.
Figure 8:
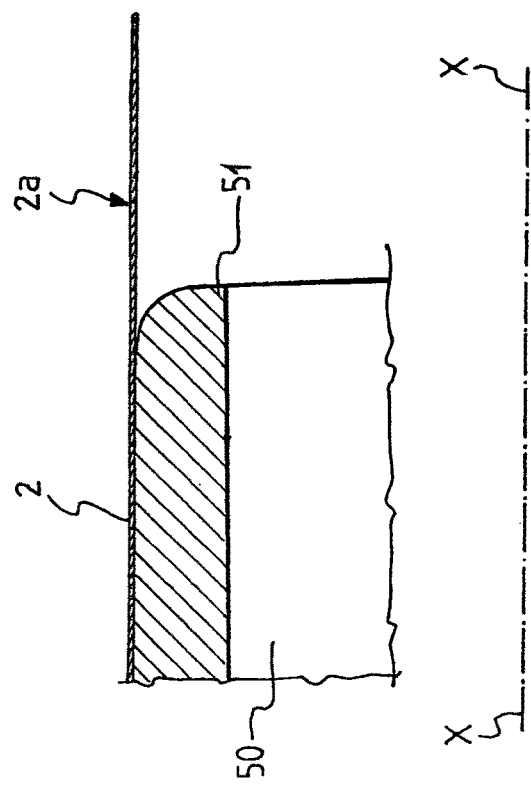

In a first process step, illustrated in FIG. 8, the carcass ply 2 is laid on the forming support 50 so that an end edge 2a thereof project cantilevered from the forming support 50. The bead core positioning device 110, the device 130 for pulling down the filling insert 12, the ply pulling down device 120 and the turning up device 140 are in a distal position with respect to the forming support 50. In this operating configuration, the bead core positioning device 110 radially supports the annular anchoring structure 10.

In a subsequent process step, shown in FIG. 9, the ply pulling down device 120 is axially moved towards the forming support 50 (arrow G'). This movement produces the corolla-like opening of finger plates 121.

Subsequently (FIG. 10), also the bead core positioning device 110 is axially moved towards the forming support 50 (arrow F'), so as to move the annular anchoring structure 10 close to the forming support 50. In particular, the bead core positioning device 110, by means of the bead core positioning members 118, acts pushing on a side surface of the substantially circumferential annular insert 11 of the annular anchoring structure 10.

The axial movement of the bead core positioning device 10 causes the movement of finger plates 121 along the curved dotted line indicated with C in FIG. 9; finger plates 121 are thus closed and, as a consequence of such closure, the movement of the end edge 2a of the carcass ply towards the axis X-X of the forming support 50 is achieved. The annular anchoring structure 10 can thus be brought in contact with the end edge 2a of the carcass ply 2 at the side 51 of the forming support 50.

In a subsequent step, shown with dotted line in FIG. 10, while the bead core positioning device 110 acts pushing the substantially circumferential annular insert 11 for retaining it into position against the side 51 of the forming support 50 (arrow F'), rollers 131 are moved for obtaining the pulling down of the filling insert 12 on the carcass ply 2 (arrow R).

In particular, such pulling down takes place by first exerting a predetermined thrust on a radially inner annular portion of the side surface 12a of the filling insert 12 and then, by axially moving rollers 131 towards the forming support, 50, exerting such thrust on a progressively larger portion of the side surface 12a of the filling insert 12 starting from the above radially inner annular portion along all the radial extension of the side surface 12a.

The actuation of the above steps allows the firm anchoring of the annular anchoring structure 10 on the end edge 2a of the carcass ply 2. Such firm anchoring is ensured by the stickiness with the rubber mixture of the carcass ply 2 both of the rubber mixture of the annular substantially circumferential insert 11 of the annular anchoring structure 10 and of the rubber mixture of the pull down filling insert 12.

Figure 11:
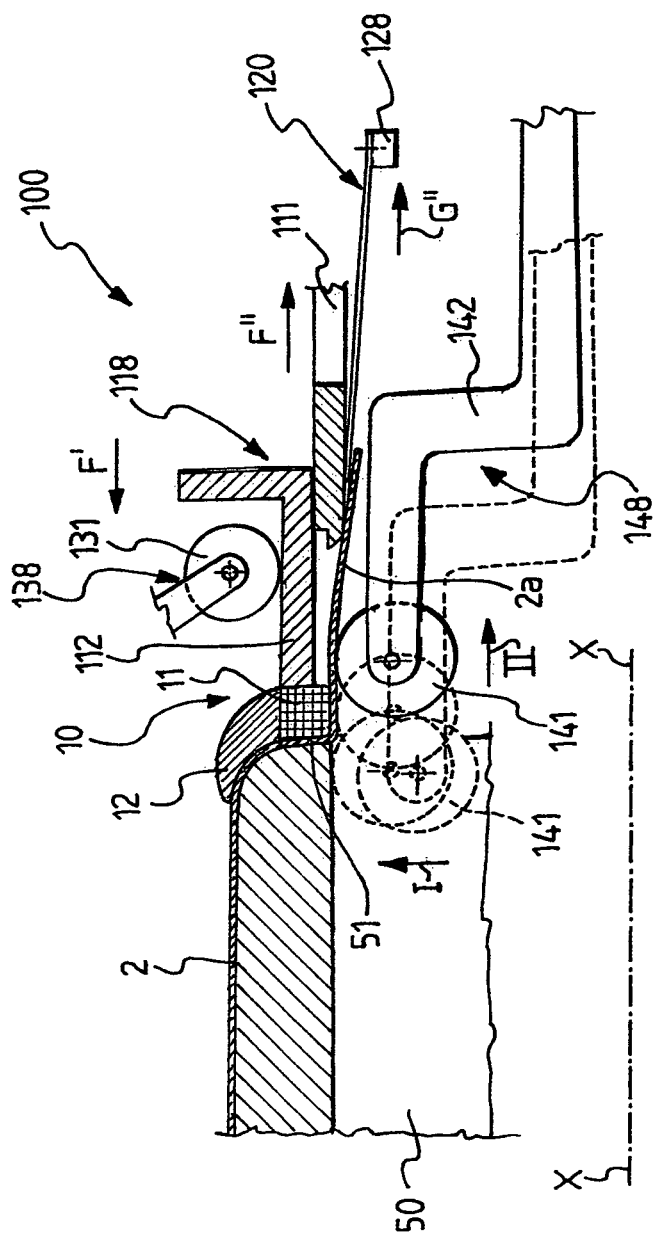
FIG. 11 is a view corresponding to that of FIG. 8, wherein the detail of FIG. 8 is shown in a fourth operating configuration thereof.

In a subsequent step, illustrated in FIG. 11, while the radially outer annular portion 112 of each bead core positioning member 118 of the bead core positioning device 110 continues to push on the substantially circumferential annular insert 11 for retaining the annular anchoring structure 10 into position against the side 51 of the forming support 50 (arrow F'), the radially inner annular portion 111 of each bead core positioning member 118 of the bead core positioning device 110 and the ply pulling down device 120 are axially moved away from the forming support (arrow F" and G"). The ply pulling down device 120 thus releases the radially inner surface 10a of the annular anchoring structure, exposing such surface to the end edge 2a of the carcass ply 2.

At this point, always retaining the radially outer annular portion 112 of each bead core positioning member 118 of the bead core positioning device 142 pushing on the substantially circumferential annular insert 11 against the side 51 of the forming support 50 (arrow F'), arms 142 of the turning up device 140 are moved for carrying out, by the respective rollers 141, a first step of turning up the end edge 2a of the carcass ply 2 around the annular anchoring structure 10.

In particular, in the embodiment shown in FIGS. 8-12, and with specific reference to FIG. 11, arms 142 are first shifted radially outwardly (arrow I), so as to bring rollers 142 in contact with the end edge 2a of the carcass ply, to then be shifted axially away from the forming support 50 (arrow II), so as to make the rollers 141 rolling on the radially inner surface 10a of the annular anchoring structure 10. Such rolling causes the adhesion of the end edge 2a of the carcass ply 2 to the radially inner surface 10a of the annular anchoring structure 10.

Figure 12:
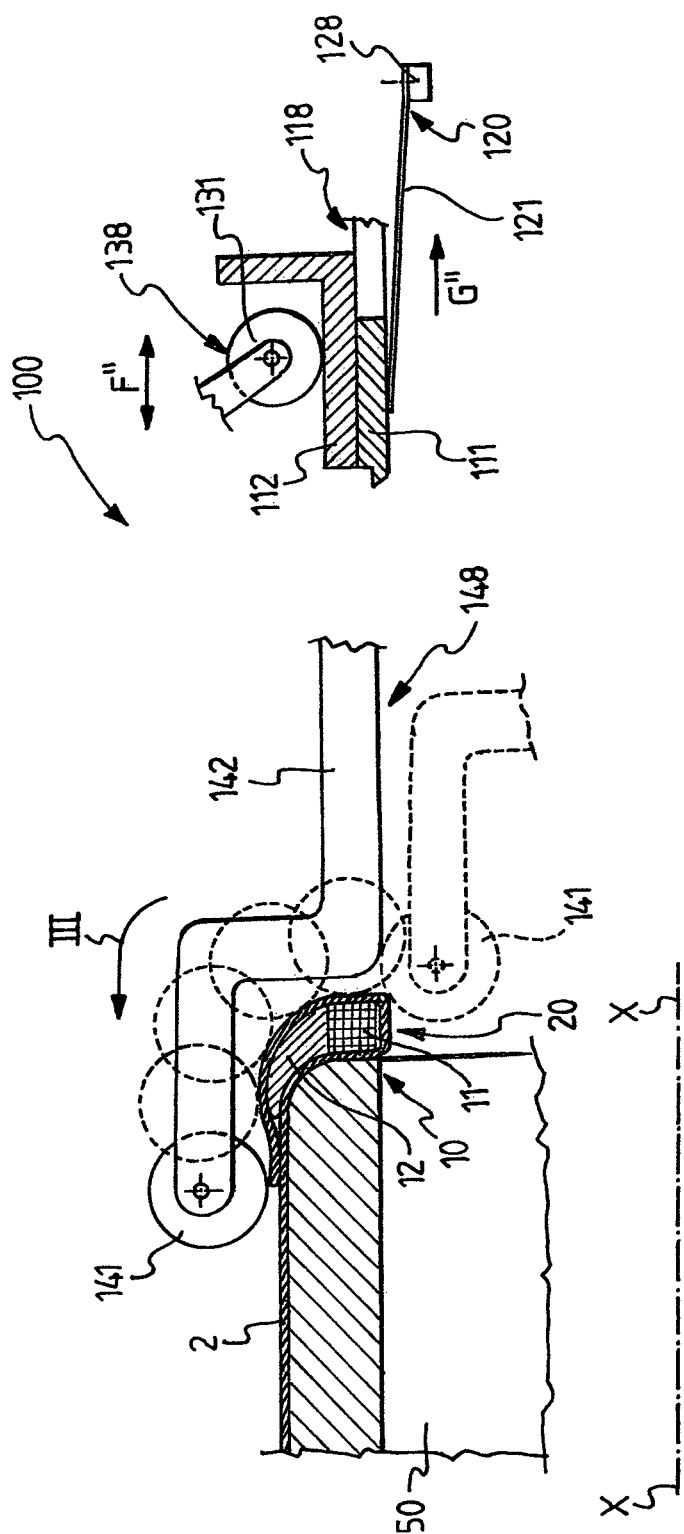
FIG. 12 is a view corresponding to that of FIG. 8, wherein the detail of FIG. 8 is shown in a fifth operating configuration thereof.

In a subsequent process step, shown in FIG. 12, the radially outer annular portion 112 of each bead core positioning member 118 of the bead core positioning device 110 is axially moved away from the forming support 50 (arrow F"). Arms 142 are thus moved first in a radially outer direction and then also in a radially inner direction, to complete the turning up of the end edge 2a of the carcass ply 2 around the annular anchoring structure 10 (arrow III).

A subsequent step of passing a pressing member (not shown) on the turned up end 20 of the carcass ply 2 is also preferably provided so as to compact the tyre bead thus formed.

In the building of the carcass structure of the tyre, the above steps of pulling down the end edge 2a of the carcass ply 2, positioning the annular anchoring structure 10 on the end edge 2a of the carcass ply 2, pulling down the filling insert 12 and turning up the end edge 2a around the annular anchoring structure 10 are repeated several times if more than one annular anchoring structure 10 must be associated on the end edge 2a of the carcass ply 2.

Moreover, further operating steps may be provided in addition to those described above, wherein the specific reinforcing structures (not shown) are associated to the carcass ply 2 in radially and/or axially outer and/or inner position to each annular anchoring structure 10.

From the above description it is clear that the process and the apparatus described above allow manufacturing high quality tyres, wherein the position of bead core 10 is that desired and defined in the design stage, such position not being altered by effect of the stresses to which the bead core 10 is subjected during the steps of pulling down the filling insert 12 and turning up the free end portion 2a of the carcass ply 2. This is due to the fact that a first part of the step of turning up the end edge 2a of the carcass 2, and preferably also the step of pulling down the filling insert 12, is carried out while bead core 10 is retained into contact position with the end edge 2a of the carcass ply 2 by the bead core positioning device 110.

The invention claimed is:

1. A process for manufacturing a tyre for vehicle wheels, comprising building, on a forming support extending about a longitudinal axis, a carcass structure comprising at least one carcass ply and, at at least one end edge of the carcass ply, at least one annular anchoring structure comprising at least one substantially circumferential annular insert and at least one filling insert associated with said at least one substantially circumferential annular insert in a radially outer position thereof, wherein building the carcass structure comprises:

laying said at least one carcass ply on the forming support;

bringing the annular anchoring structure in contact position with the end edge of the carcass ply by at least one positioning device comprising a plurality of positioning members mounted on a first annular element which is slidable along a direction parallel to said longitudinal axis;

turning up the end edge of the carcass ply about the annular anchoring structure by at least one turning up device, so as to form a turned up end portion of the carcass ply, said turned up end portion comprising the annular anchoring structure, said at least one turning up device comprising a plurality of turning up members mounted on a second annular element which is slidable along said direction parallel to said longitudinal axis, the second annular element being arranged in an axially outer position with respect to the first annular element; and folding down the filling insert on the carcass ply using a plurality of rollers mounted on the at least one positioning device,
wherein a first part of turning up the end edge of the carcass ply is carried out while the at least one positioning device retains the annular anchoring structure in contact position with the end edge of the carcass ply,
wherein, before the annular anchoring structure is placed in contact position with the end edge of the carcass ply, the end edge of the carcass ply is folded down toward the longitudinal axis of the forming support by at least one ply folding down device mounted on a third annular element which is slidable along a direction parallel to said longitudinal axis and axially interposed between said first annular element and said second annular element, and
wherein the second annular element is mounted on three longitudinal screws arranged at 120° with respect to each other and passing through the first annular element, and a pair of pneumatic cylinders are provided between the first annular element and the third annular element to control relative axial sliding of the first annular element with respect to the third annular element.

2. The process according to claim 1, comprising, prior to turning up the end edge of the carcass ply around the annular anchoring structure and while a radially outer annular portion of said at least one positioning device retains the annular anchoring structure in contact position with the end edge of the carcass ply, axially moving away a radially inner annular portion of the positioning device from the forming support.

3. The process according to claim 2, further comprising, prior to turning up the end edge around the annular anchoring structure, axially moving away said ply folding down device from the forming support.

4. The process according to claim 3, wherein folding down the end edge of the carcass ply toward the longitudinal axis of the forming support is carried out by the ply folding down device by the movement of said at least one positioning device toward the forming support along a direction parallel to the longitudinal axis of the forming support.

5. The process according to claim 2, further comprising, before carrying out the remaining part of turning up the end edge of the carcass ply, axially moving away the radially outer annular portion of said at least one positioning device from the forming support.

6. The process according to claim 1, wherein folding down the filling insert is carried out while said at least one positioning device retains the substantially circumferential annular insert in contact position with the end edge of the carcass ply.

7. The process according to claim 1, wherein turning up the end edge of the carcass ply is carried out by axially moving and radially expanding a turning up device extended coaxially to the longitudinal axis of the forming support.

8. The process according to claim 1, wherein the number of positioning members is equal to the number of turning up members.

9. The process according to claim 1, wherein each of the plurality of turning up members is spaced along the second annular element in a circumferential direction.

10. The process according to claim 1, wherein the third annular element is coupled to said three longitudinal screws.

11. An apparatus for manufacturing a tyre for vehicle wheels, the tyre comprising a carcass structure formed starting from at least one carcass ply laid on a forming support extended about a longitudinal axis, and having, at at least one end edge of the carcass ply, at least one annular anchoring structure comprising at least one substantially circumferential annular insert and at least one filling insert associated with said at least one substantially circumferential annular insert in a radially outer position thereof,
the apparatus comprising:
at least one positioning device for positioning said at least one annular anchoring structure on the at least one end edge of the carcass ply, the at least one positioning device comprising a plurality of positioning members mounted on a first annular element which is slidable along a direction parallel to said longitudinal axis;
at least one device for turning up the at least one end edge of the carcass ply, wherein said at least one positioning device is configured for allowing the turning up device to carry out a first part of the turning up of the at least one end edge of the carcass ply while the at least one positioning device retains the annular anchoring structure in contact position with the end edge of the carcass ply, the at least one turning up device comprising a plurality of turning up members mounted on a second annular element which is slidable along a direction parallel to said longitudinal axis, the second annular element arranged in an axially outer position with respect to the first annular element;
at least one device for folding down the at least one filling insert on the end edge of the carcass ply, said at least one folding down device comprising a plurality of rollers, mounted on the at least one positioning device; and
at least one ply folding down device for folding down the end edge of the carcass ply toward the longitudinal axis of the forming support, the at least one ply folding down device being mounted on a third annular element which is slidable along a direction parallel to said longitudinal axis and axially interposed between said first annular element and said second annular element,
wherein the second annular element is mounted on three longitudinal screws arranged at 120° with respect to each other and passing through the first annular element, and a pair of pneumatic cylinders are provided between the first annular element and the third annular element to control relative axial sliding of the first annular element with respect to the third annular element.

12. The apparatus according to claim 11, wherein said at least one positioning device comprises a radially inner annular portion and a radially outer annular portion which are slidable with respect to one another along said direction.

13. The apparatus according to claim 11, wherein the device for turning up the at least one end edge of the carcass ply is extended coaxially to the longitudinal axis of the forming support and radially expandable with respect to the forming support.

14. The apparatus according to claim 13, wherein said turning up device comprises a plurality of rollers arranged adjacent to one another along a circumferential direction and coaxially to the longitudinal axis of the forming support, said rollers being radially movable in a synchronous manner with respect to the forming support.

15. The apparatus according to claim 14, wherein each roller is associated with a circumferentially consecutive roller by the interposition of a respective compression spring.

16. The apparatus according to claim 11, wherein said at least one folding down device being slidable with respect to the positioning device of the annular anchoring structure, between a non-operating axial position and an operating axial position.

17. The apparatus according to claim 16, wherein the device for folding down the end edge of the carcass ply comprises a plurality of longitudinal finger plates arranged side by side in a circumferential direction and coaxially to the longitudinal axis.

18. The apparatus according to claim 17, wherein said at least one positioning device is slidable along a direction parallel to the longitudinal axis of the forming support and comprises a radially inner annular portion and a radially outer annular portion which are slidable with respect to one another along said direction and wherein the device for positioning the annular anchoring structure is axially slidable in a radially outer position with respect to the finger plates, the finger plates being kept by said positioning device in a radially contracted configuration when at least the radially inner annular portion of said positioning device is radially overlapped with the finger plates and taking a radially expanded configuration when said positioning device is axially moved with respect to the folding down device of the end edge of the carcass ply so as not to be radially overlapped to the finger plates.

19. The apparatus according to claim 17, wherein the finger plates are partially overlapped in a circumferential direction when the device for folding down the end edge of the carcass ply is in the axial operating position thereof.

20. The apparatus according to claim 11, wherein the at least one device for folding down the filling insert on the end edge of the carcass ply is slidingly associated with the device for positioning the annular anchoring structure.

* * * * *